United States Patent [19]

Fuller

[11] Patent Number: 4,562,950
[45] Date of Patent: Jan. 7, 1986

[54] METHOD OF FORMING TAPERED TUBES

[75] Inventor: Oliver C. Fuller, 116 N. Clay, Hinsdale, Ill. 60521

[73] Assignee: Oliver C. Fuller, Moab, Utah

[21] Appl. No.: 481,679

[22] Filed: Apr. 4, 1983

[51] Int. Cl.$^4$ .............................................. B23K 31/02
[52] U.S. Cl. .................... 228/170; 29/155 C
[58] Field of Search ............. 29/155 C, 412, 415, 29/417, 463, DIG. 20; 228/170, 171; 362/431; D26/67

[56] References Cited

U.S. PATENT DOCUMENTS

| | | | |
|---|---|---|---|
| 999,267 | 8/1911 | Slick | 29/463 |
| 1,498,176 | 6/1924 | Lachman | 29/DIG. 20 |
| 1,574,563 | 2/1926 | Duff | 29/155 C |
| 1,594,658 | 8/1926 | Bushong | 29/155 C |
| 1,722,671 | 7/1929 | Lingo | 29/155 C |
| 1,877,583 | 9/1932 | Pfaff | 29/155 C |
| 2,418,312 | 4/1947 | Michelman | 29/155 C |

Primary Examiner—Kenneth J. Ramsey
Assistant Examiner—M. Jordan
Attorney, Agent, or Firm—Harness, Dickey & Pierce

[57] ABSTRACT

A method of forming tapered tubes for use as utility poles and the like comprises the steps of making a pair of cuts generally lengthwise of a cylindrical tube on opposite sides of the tube but offset at one end from a common diameter the same distance in the same direction and slanting the cuts so that at the other end of the tube they are on the opposite side of the same diameter, leaving a pair of tube halves having a small arc and a large arc at each end, reversing one of the tube halves to place both small arcs at one end and both large arcs at the other end, welding the halves to each other along the cut edges, and pressing the resultant tube to substantially circular cross section.

8 Claims, 4 Drawing Figures

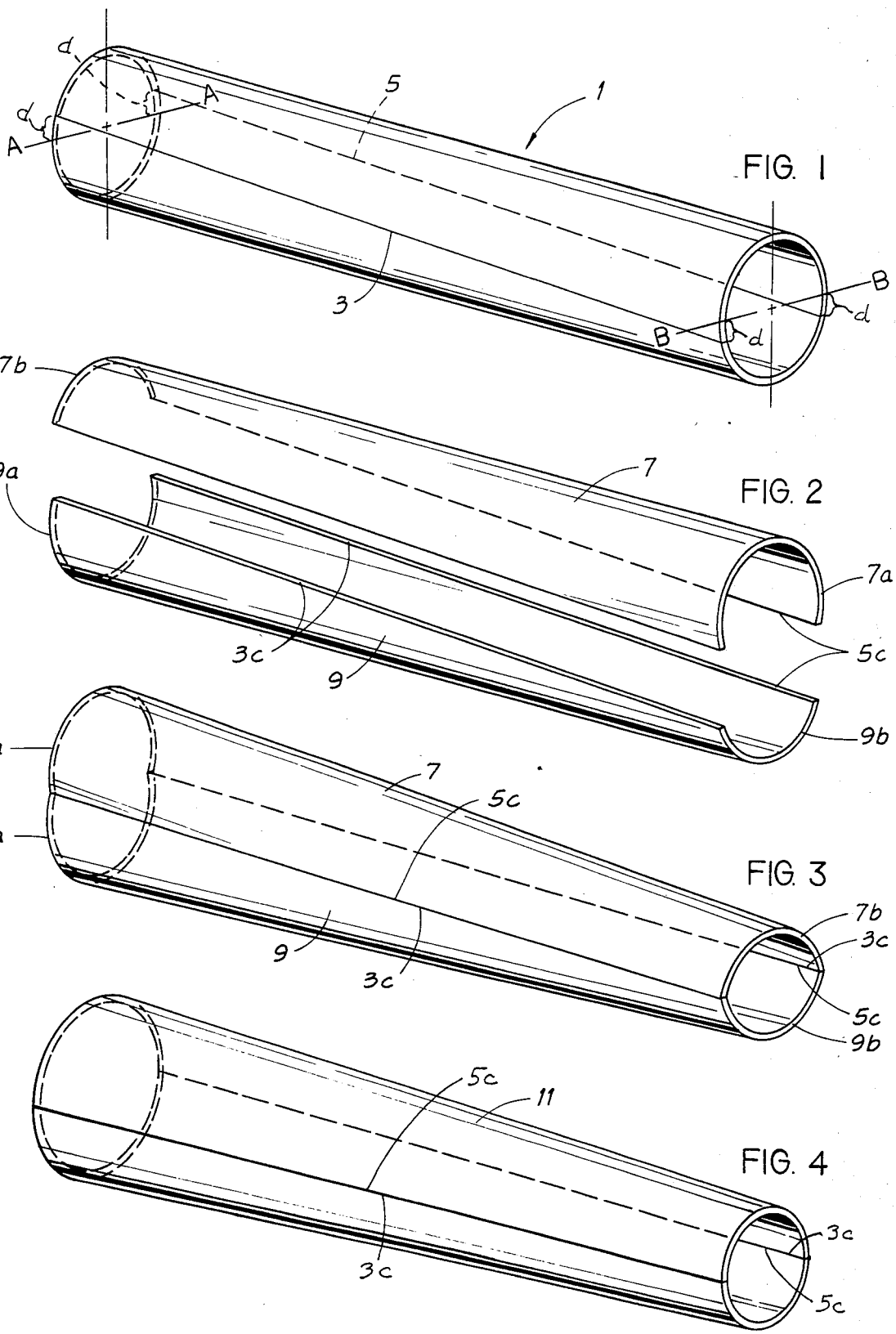

METHOD OF FORMING TAPERED TUBES

BACKGROUND OF THE INVENTION

1. Field of the Invention

The invention relates to the manufacture of tapered metal poles and the like and consists particularly in a method of forming tapered metal tubes from cylindrical tubes.

2. The Prior Art

Prior patents disclose the idea of severing a flat sheet of metal into two identical halves by a cut generally longitudinal slightly inclined from the longitudinal axis of the sheet, reversing one of the halves lengthwise, bending them to semi-circular shape and securing them to each other along their longitudinal edges to form a tube, as taught by E. H. Slick U.S. Pat. No. 999,267, and the idea of producing conical vessels by severing a metal strip along oppositely inclined lines to form trapezoids, bending a pair of trapezoids to generally semi-circular shape and reversing one of them so that the long edges of both adjoin and the short edges of both adjoin, bending them into semi-circular shape and uniting them along the inclined edges as taught by S. Ericsson et al U.S. Pat. No. 3,348,512.

SUMMARY OF THE INVENTION

The purpose of the present invention is to provide a simple, strong and efficient tubular steel pole of longitudinally integral construction.

By using halves of a seamless cylindrical tube as blanks for making tapered tubes rather than using flat blanks of trapezoidal shape as taught by the prior art, the step of bending the blanks to generally semi-circular cross section is eliminated and replaced by a much simpler step of compressing the united tube halves to substantially circular cross section.

BRIEF DESCRIPTION OF THE DRAWINGS

FIG. 1 is an isometric view of a length of cylindrical seamless tube.

FIG. 2 corresponds to FIG. 1, but shows the tube of FIG. 1 severed in accordance with the invention.

FIG. 3 is an isometric view showing the tube halves reversed lengthwise with respect to each other and united along their longitudinal edges in accordance with the invention.

FIG. 4 is an isometric view of the completed tapered tube after being pressed into substantially circular cross section.

DETAILED DESCRIPTION OF THE INVENTION

A cylindrical tube generally indicated at 1 in FIG. 1, in which its horizontal center lines A—A and B—B, defining a common diametral plane, are shown at its left and right hand ends respectively, is severed along lines 3 and 5 which intersect the lefthand end of the tube the same distance d above horizontal center line A—A as they intersect the righthand end of the tube below horizontal center line B—B to form separate blanks comprising tube halves 7 and 9 as seen in FIG. 2, having horizontal edges 3c and 5c and each respectively having a large arc end 7a and 9a and a small arc end 7b and 9b.

As seen in FIG. 3, the top half 7 is reversed lengthwise so that its small end 7b adjoins small end 9b of tube half 9 and the large ends 7a and 9a of tube halves 7 and 9 respectively adjoin each other and after reforming the halves to circular cross section, the halves are welded together along their adjoining cut edges 3c and 5c to form a tube having a large circumference at one end and a small circumference at the other, as seen in FIG. 4.

It will be evident that the taper of the tube can be infinitely varied by variations of the distance d of the cuts from the diametral plane.

The details of the method may be varied substantially without departing from the spirit of the invention and the exclusive use of such modifications as come within the scope of the appended claims is contemplated.

I claim:

1. The method of forming tapered tubes comprising the steps forming a pair of tube parts by making a pair of cuts generally lengthwise and through the full length of a cylindrical tube with one cut on each on its opposite sides and not parallel to a diametral plane in the same direction to form respective edges defining a small arc and a large arc at each end of each part, and assembling at least two parts so formed to each other along the cut edges by affixing one edge directly to another to form a tube section having a larger diameter at one end than the other.

2. The method of forming tapered tubes according to claim 1, wherein both cuts intersect said one end equidistant from the diametral plane.

3. The method of forming tapered tubes according to claim 2, wherein the cuts intersect the other end of the tube equidistant from the same diametral plane.

4. The method of forming tapered tubes according to claim 1, wherein both cuts intersect both ends of the cylindrical tube the same distance from the diametral plane.

5. The method of forming tapered tubes according to claim 1, wherein the tube halves are welded to each other along the cut edges.

6. The method as set forth in claim 1 wherein the cuts lie in a common plane.

7. The method as set forth in claim 6 wherein the common plane intersects the diametral plane.

8. The method as set forth in claim 1 wherein the two joined tube parts are formed from the same cylindrical tube.

* * * * *